US008103929B2

(12) United States Patent
Kwon et al.

(10) Patent No.: US 8,103,929 B2

(45) Date of Patent: Jan. 24, 2012

(54) APPARATUS AND METHOD FOR TRANSMITTING FORWARD/REVERSE ACK/NACK IN MOBILE COMMUNICATION SYSTEM

(75) Inventors: Hwan-Joon Kwon, Hwaseong-si (KR); Jin-Kyu Han, Seoul (KR); Jae-Hyun Park, Suwon-si (KR); Seung-Kyun Oh, Suwon-si (KR); Dong-Hee Kim, Yongin-si (KR); Jae-Chon Yu, Suwon-si (KR); Yeon-Ju Lim, Seoul (KR); Zhouyue Pi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1076 days.

(21) Appl. No.: 11/853,609

(22) Filed: Sep. 11, 2007

(65) Prior Publication Data

US 2008/0141093 A1 Jun. 12, 2008

(30) Foreign Application Priority Data

Sep. 11, 2006 (KR) ........................ 10-2006-0087670
Sep. 11, 2006 (KR) ........................ 10-2006-0087694

(51) Int. Cl.
*H04L 1/18* (2006.01)

(52) U.S. Cl. ......................... 714/749; 714/746; 714/754

(58) Field of Classification Search .................. 714/749, 714/750, 751, 754, 746; 370/236
See application file for complete search history.

(56) References Cited

U.S. PATENT DOCUMENTS

| | | | | |
|---|---|---|---|---|
| 2002/0037000 | A1 | 3/2002 | Park et al. | |
| 2005/0180328 | A1 * | 8/2005 | Kim et al. | 370/236 |
| 2005/0286402 | A1 | 12/2005 | Byun et al. | |
| 2006/0018259 | A1 * | 1/2006 | Kadous | 370/236 |
| 2006/0276212 | A1 * | 12/2006 | Sampath et al. | 455/513 |
| 2007/0286146 | A1 * | 12/2007 | Kuroda et al. | 370/342 |
| 2008/0025249 | A1 * | 1/2008 | Kuppuswamy et al. | 370/325 |

FOREIGN PATENT DOCUMENTS

| | | |
|---|---|---|
| KR | 1020020037901 | 5/2002 |
| KR | 1020020045075 | 6/2002 |
| KR | 1020050034477 | 4/2005 |

* cited by examiner

*Primary Examiner* — Fritz Alphonse

(74) *Attorney, Agent, or Firm* — The Farrell Law Firm, P.C.

(57) ABSTRACT

Disclosed is a method and an apparatus for efficient ACKnowledgment/NonACKnowledgement (ACK/NACK) transmission in order to transmit forward data for multiple layers and support Hybrid Automatic Retransmission reQuest (HARQ) for each layer in a mobile communication system. The method includes determining whether transmission of the ACK/NACK is for a first layer or for layers higher than the first layer; and when the transmission of the ACK/NACK is for layers higher than the first layer, transmitting the reverse ACK/NACK by allocating resources to the higher layers with a quantity different from that of the first layer.

12 Claims, 13 Drawing Sheets

801 ACK/NACK BIT STREAM → 802 REPEATER/SPREADER → 803 SUB-CARRIER MAPPER → 804 ZERO INSERTER → 805 IFFT → 806 P/S CONVERTER → 807 CP ADDER

APPARATUS AND METHOD FOR TRANSMITTING FORWARD/REVERSE ACK/NACK IN MOBILE COMMUNICATION SYSTEM

PRIORITY

This application claims priority under 35 U.S.C. §119(a) to applications entitled "Apparatus And Method For Transmitting Forward/Reverse ACK/NACK In Mobile Communication System" filed in the Korean Industrial Property Office on Sep. 11, 2006 and assigned Serial Nos. 2006-87670 & 2006-87694, respectively, the contents of which are incorporated herein by reference.

BACKGROUND OF THE INVENTION

1. Field of the Invention

The present invention relates generally to a mobile communication system, and more particularly to an apparatus and a method for reverse/forward ACKnowledgement/NonACKnowledgement (ACK/NACK) transmission, which can support Hybrid Automatic Retransmission reQuest (HARQ) for multiple reverse/forward layer data transmissions in an Orthogonal Frequency Division Multiplexing (OFDM) based mobile communication system.

2. Description of the Related Art

In general, HARQ is an important technique used to improve data throughput and reliability of data transmission in a packet-based mobile communication system. The HARQ corresponds to a combination of the techniques of Automatic Retransmission reQuest (ARQ) and Forward Error Correction (FEC).

According to the ARQ technique, which is being widely used in wire/wireless data communication systems, a transmitter transmits data packets with sequence numbers attached to the data packets according to a set scheme, and a receiver requests retransmission of a missing packet from among the received packets by using the sequence numbers, thereby achieving reliable data transmission.

According to the FEC, each data packet is transmitted together with a redundant bit added thereto according to a rule, such as convolutional encoding or turbo encoding, so that the originally-transmitted data can be demodulated without noise or fading, which may occur during the data transmission/reception. In a system using the HARQ, that is, a combination of the aforementioned two techniques, the receiver performs a Cyclic Redundancy Check (CRC) for data demodulated through an inverse FEC process, in order to determine whether the data has an error. As a result of the CRC, when the data has no error, the system using the HARQ feeds back an ACKnowledgement (ACK) to the transmitter, so that the transmitter transmits a next data packet. However, when the CRC check shows that the data has an error, the HARQ system feeds back a Non-ACKnowledgement (NACK) to the transmitter, so that the transmitter retransmits the previously transmitted data packet. During this process, the receiver obtains an energy gain by combining the retransmitted packet with the previously-transmitted packet. Therefore, the HARQ system can achieve a significantly improved performance in comparison with a typical ARQ system that does not perform such a combining process.

FIG. 1 illustrates an example of a conventional HARQ.

In FIG. 1, the horizontal axis corresponds to a time axis, reference numeral 101 denotes initial transmission, and the data channel refers to a channel through which data is actually transmitted. A receiver having received the data transmitted by the initial transmission 101 demodulates the data channel. In the demodulation, when the receiver determines, by the CRC, that the transmitted data has not been correctly demodulated, the receiver feeds back an NACK 102 to the transmitter. Upon receiving the NACK 102, a data channel transmitter retransmits the data of the initial transmission 101 (first retransmission 103). Therefore, it should be noted that the data channels of the initial transmission 101 and the first retransmission 103 carry the same information. Also, it should be noted that the two data channels may have different redundancies, even when they carry the same information. As used herein, each of the data channels carrying the same information, i.e., the data channels of the transmission designated by reference numeral 101, 103, or 105, is called a sub-packet. Upon receiving the data transmitted by the first retransmission 103, the receiver combines the data of the first retransmission 103 with the data of the initial transmission 101 according to a rule and then demodulates the data channel by using the combined data. Through this process, when the receiver determines, by CRC for the data channel, that the transmitted data has not been correctly demodulated, the receiver feeds back a NACK 104 to the transmitter. Upon receiving the NACK 104, the transmitter performs second retransmission 105 of the data after a time interval passes from the time point of the first retransmission 103. As a result, the data channels of the initial transmission 101, the first retransmission 103 and the second retransmission 105 carry the same information. Upon receiving the data transmitted by the second retransmission 105, the receiver combines the data of the initial transmission 101, the first retransmission 103 and the second retransmission 105 with each other according to a rule and then demodulates the data channel by using the combined data. Through this process, when the receiver determines, by CRC for the data channel, that the transmitted data has been correctly demodulated, the receiver feeds back an ACK 106 to the transmitter. Upon receiving the ACK 106, the transmitter transmits an initially transmitted sub-packet 107 for next data information. The initial transmission 107 may be performed either instantly as soon as the ACK 106 is received or after the passage of a time interval, according to a scheduling scheme.

In order to support HARQ as described above, the receiver should feed back the ACK/NACK. As used herein, a channel transmitting the ACK/NACK is called an "ACK CHannel (ACKCH)."

Meanwhile, multiple antenna technology for improving the data rate or throughput of a system includes schemes of Spatial Multiplexing (SM) and Spatial Domain Multiple Access (SDMA). According to the SM, a transmitter transmits multiple data streams through multiple antennas to a single receiver. According to the SDMA, a transmitter transmits multiple data streams to multiple receivers. The SM and SDMA schemes are called schemes using multiple layers.

In order to perform data transmission for multiple layers and support HARQ for each layer, it is necessary to consider an efficient ACKCH. Hereinafter, a conventional method for ACKCH transmission in a system performing data transmission for multiple layers and supporting HARQ for each layer will be described.

First, a transmission method and a resource allocation method for an ACKCH for one layer in a conventional Orthogonal Frequency Division Multiple Access (OFDMA) system are discussed.

In a conventional forward OFDMA data system, a basic resource unit for forward data transmission is defined. As used herein, the basic resource unit is referred to as a "data resource channel." Usually, one data resource channel is defined for multiple OFDM symbols in the time domain and for multiple sub-carriers in the frequency domain. For example, one data channel includes 8 OFDM symbols and 16 sub-carriers. If a system includes 480 sub-carriers available in the frequency domain, and if the system includes 30 data resource channels, a maximum of 30 bits are necessary for reverse ACK/NACK transmission. This is because it should be possible to transmit one bit of reverse ACK/NACK feedback for each forward data resource channel, in order to enable transmission of the same number of reverse ACK/NACK responses as the number of forward data resource channels. Hereinafter, specific examples of the reverse ACK/NACK transmission of resource allocation for the reverse ACK/NACK transmission according to the prior art will be discussed.

FIG. 2 illustrates a structure of a conventional transmitter for transmitting a reverse ACK/NACK response in response to forward data transmission received by a Mobile Station (MS).

The transmitter includes a first zero inserter 202, a Discrete Fourier Transform (DFT) unit 203, a sub-carrier mapper 204, a second zero inserter 205, an Inverse Fast Fourier Transform (IFFT) unit 206, a Parallel-to-Serial (P/S) converter 207, a Cyclic Prefix (CP) adder 208 and a controller 210.

In FIG. 2, reference numeral 201 denotes ACK/NACK, which is selectively determined according to whether the received forward data has been correctly demodulated, and if not, requires retransmission thereof. The ACK/NACK is input to the 16 point DFT unit 203. From among the DFT inputs, only one input is mapped to a resource channel located at a position corresponding to the resource channel through which the MS has received forward data, while the other inputs to the DFT unit 203 are filled with “0” by the first zero inserter 202. For example, if the data received by the MS in the forward direction has been transmitted through a resource channel “0,” and if the $0^{th}$ input of the 16 point DFT unit has been mapped in advance to the resource channel “0”, the MS transmits the ACK/NACK by using only the $0^{th}$ DFT input, while the other inputs of the 16 point DFT unit 203 are filled with “0.” This process is controlled by the controller 210. The outputs of the 16 point DFT unit 203 are input to the sub-carrier mapper 204 for sub-carrier mapping. Specifically, the outputs of the 16 point DFT unit 203 are mapped to sub-carriers at positions from among the 480 sub-carriers as in the above-described example. If the OFDM system employs 512 size Fast Fourier Transform (FFT), the second zero inserter fills “0” in sub-carriers at positions other than those of the outputs of the sub-carrier mapper 204. Then, the sub-carriers are processed by the IFFT unit 206, a P/S converter 207 and a CP adder 208 according to a conventional OFDM symbol generating process for transmission.

FIG. 3 illustrates a conventional mapping relation between reverse ACK/NACK transmission and forward resource channels, and a sub-carrier mapping process by the sub-carrier mapper of FIG. 2.

The outputs of the 16 point DFT unit 203 of FIG. 2 have 16 point values, which are transmitted by the portion designated by reference numeral 310 in FIG. 3. The horizontal axis in FIG. 3 corresponds to a time axis and each segment of the horizontal axis corresponds to one OFDM symbol interval. Further, the vertical axis corresponds to a frequency axis, and each segment of the vertical axis corresponds to one sub-carrier. The entire rectangular box shown in FIG. 3 is called a “tile,” and serves as a basic resource allocation unit of reverse transmission in a conventional OFDM system. The portion designated by reference numeral 310 in FIG. 3 includes 16 cells. That is, 8 consecutive sub-carriers are distributed over two OFDM symbols, which indicates that the portion 310 has a structure which can carry the outputs of the 16 point DFT unit. In the prior art, there is a one-to-one mapping relation between the forward resource channels and the DFT inputs. In other words, the downlink resource channels 0 to 7 are mapped to the DFT inputs 0 to 7, which are then loaded on the portion designated by reference numeral 310. In the same manner, the downlink resource channels 8 to 15 are mapped to the DFT inputs 0 to 7, which are then loaded on the portion designated by reference numeral 320. Also, in the same manner, the downlink resource channels 16 to 23 are mapped to the DFT inputs 0 to 7, which are then loaded on the portion designated by reference numeral 330. Moreover, in the same manner, the downlink resource channels 24 to 31 are mapped to the DFT inputs 0 to 7, which are then loaded on the portion designated by reference numeral 330. As described above, portions corresponding to one-half of the tile shown in FIG. 3 are used for transmission of the reverse ACK/NACK. Each of the portions designated by reference numerals 310, 320, 330 and 340 are usually called a “sub-tile.” Further, three more tiles each having the same structure as that shown in FIG. 3 are used for the transmission. As a result, a total of four tiles each having the same structure as that shown in FIG. 3 are used for transmission of the reverse ACK/NACK. The four tiles have a simply repeated structure and are spaced from each other. The reason why the structure is simply repeated four times is in order to enhance the reliability in receiving the transmitted ACK/NACK. In brief, a total of 16 sub-tiles are used the reverse ACK/NACK transmission, which indicates that resources corresponding to two tiles from among a total of 30 reverse tiles are used for the reverse ACK/NACK transmission. In the above-described structure, the inputs of DFT 8 to 15 are not used so that they can be used for measurement of interference to the tile by a base station receiver. The four sub-tiles transmitting one ACK/NACK bit as described above experience different interferences. Therefore, the receiver measures the quantity of interference for each sub-tile during the process of demodulating the single ACK/NACK bit repeatedly received four times over the four sub-tiles, and uses different weights according to the quantity of interference in combining the four-time-repeated ACK/NACK, thereby improving the reception capability.

Meanwhile, when a plurality of layers are used for forward data transmission, a conventional method for reverse ACK/NACK transmission and resource allocation for the transmission correspond to extension of the method described above with reference to FIGS. 2 and 3 by an amount corresponding to the number of the layers. For example, when two layers are used in the forward direction, a total of 16 sub-tiles are used for the reverse ACK/NACK transmission. When four layers are used in the forward direction, a total of 32 sub-tiles are used for the reverse ACK/NACK transmission. In other words, four tiles and eight tiles are used for the reverse ACK/NACK transmission, respectively. This implies that 13.3% and 26.7% of the entire resources are used for the reverse ACK/NACK transmission, respectively. That is, too many resources are used for the reverse ACK/NACK transmission.

Meanwhile, in order to perform data transmission for multiple layers and support HARQ for each layer, it is necessary to consider an efficient ACKCH. Hereinafter, a conventional method for forward ACKCH transmission in a system performing reverse data transmission for multiple layers and supporting HARQ for each layer will be described.

First, a transmission method and a resource allocation method for a forward ACKCH for one layer in a conventional reverse OFDMA system are discussed. In a typical forward OFDMA system, a basic resource unit for forward data transmission is defined. As used herein, the basic resource unit is referred to as a "data resource channel." Usually, one data resource channel is defined for multiple OFDM symbols in the time domain and for multiple sub-carriers in the frequency domain. For example, one data channel includes 8 OFDM symbols and 16 sub-carriers. If a system includes, for example, 480 sub-carriers available in the frequency domain, and if the system includes 30 data resource channels, a maximum of 30 bits are necessary for reverse ACK/NACK transmission. This is because it should be possible to transmit one bit of reverse ACK/NACK feedback for each forward data resource channel.

That is, transmission of the same number of reverse ACK/NACK responses as the number of forward data resource channels should be possible. Hereinafter, specific examples of the forward ACK/NACK transmission and resource allocation for the forward ACK/NACK transmission according to the prior art will be discussed.

FIG. 4 illustrates a conventional structure of a transmitter transmitting a forward ACK/NACK response to reverse data transmission from a plurality of MSs.

The conventional transmitter includes a 3-time repeater 402, an interleaver 403, a sub-carrier mapper 404, a multiplexer 405, an Inverse Fast Fourier Transform (IFFT) unit 406, a Parallel-to-Serial (P/S) converter 407 and a CP adder 408.

In FIG. 4, reference numeral 401 denotes an ACK/NACK bit stream. That is, one ACK/NACK bit is transmitted to one MS. The ACK/NACK has a value that is determined according to whether the received forward data has been correctly demodulated or has not been correctly demodulated and requires retransmission thereof. The 3-time repeater 402 repeats the ACK/NACK three times. Since it is assumed that there are 30 reverse resource channels, the 3-time repeater 402 yields 90 bits of outputs. Then, the interleaver 403 interleaves the 90 bits of outputs according to an interleaving scheme and then sends the interleaved outputs to the sub-carrier mapper 404. Then, the sub-carrier mapper 404 maps the 90 bits to sub-carriers at locations in the time and frequency domain from among the 480 sub-carriers. That is, 90 bits are transmitted by multiple sub-carriers and multiple OFDM symbols. Usually, in the mapping, the 90 bits are distributed as widely as possible in the time and frequency domain, in order to achieve the diversity effect as much as possible.

The multiplexer 405 multiplexes the outputs of the sub-carrier mapper 404. Specifically, the multiplexer 405 multiplexes the outputs of the sub-carrier mapper 404 with another channel, for example, a forward data channel. The output of the multiplexer 405 is transmitted after being processed by the IFFT unit 406, the P/S converter 407 and the CP adder 408 according to a typical OFDM symbol generating process.

Meanwhile, when a plurality of layers are used for reverse data transmission, a conventional method for forward ACK/NACK transmission and resource allocation for the transmission correspond to extension of the method described above with reference to FIG. 4 by an amount corresponding to the number of the layers. That is, the input ACK/NACK bit stream of FIG. 4 has a size of the number of reverse resource channels×the number of layers. For example, when two layers are used in the reverse direction, the forward ACK/NACK bit stream has a size of 60 (30×2). When four layers are used in the reverse direction, the forward ACK/NACK bit stream has a size of 120 (30×4).

The bit stream is repeated three times as described above, and the other process is the same as in FIG. 4. According to the method as described above, even when reverse transmission for multiple layers is supported, the number of resource channels of the multiple layers is actually limited. However, the method uses as many forward resources as a multiple of the number of the layers, so as to cause a waste of forward resources.

SUMMARY OF THE INVENTION

Accordingly, the present invention has been made to solve the above-mentioned problems occurring in the prior art, and the present invention provides a method and an apparatus for efficient ACK/NACK transmission in order to transmit forward data for multiple layers and support HARQ for each layer in a mobile communication system.

The present invention provides a method and an apparatus for resource allocation and transmission of reverse ACK/NACK, which employ the same transmission scheme regardless of the layer, while changing the quantity of allocated resources according to each layer.

The present invention provides a method and an apparatus for improving a capability of receiving a reverse ACK/NACK in a mobile communication system.

The present invention provides a method and an apparatus for transmitting a forward ACK/NACK in a mobile communication system having an improved capability of receiving a forward ACK/NACK.

The present invention provides a method and an apparatus for transmitting a forward ACK/NACK while changing the number of times for repeating the ACK/NACK according to each layer in a mobile communication system.

In accordance with the present invention, there is provided a method for transmitting a reverse ACK/NACK through multiple layers in an OFDM mobile communication system, including determining whether transmission of the ACK/NACK is transmission for a first forward layer or transmission for layers higher than the first forward layer, and when the transmission of the ACK/NACK is transmission for layers higher than the first forward layer, transmitting the reverse ACK/NACK by allocating resources to the higher layers with a quantity different from that of the first forward layer.

In accordance with the present invention, there is provided a method for transmitting a forward ACK/NACK through multiple layers in an OFDM mobile communication system, including determining whether transmission of an ACK/NACK is transmission for a first reverse layer or transmission for layers higher than the first reverse layer; and when the transmission of an ACK/NACK is transmission for layers higher than the first reverse layer, transmitting an ACK/NACK for the higher layers after repeating the ACK/NACK a number of times different from a number of times by which the ACK/NACK for the first layer has been repeated.

In accordance with the present invention, there is provided an apparatus for transmitting a reverse ACK/NACK through multiple layers in an OFDM mobile communication system, including a controller for determining whether transmission of an ACK/NACK is transmission for a first forward layer or transmission for layers higher than the first forward layer, and when the transmission of an ACK/NACK is transmission for layers higher than the first forward layer, transmitting a reverse ACK/NACK by allocating resources to the higher layers with a quantity different from that of the first forward layer, and a sub-carrier mapper for mapping the allocated resources.

In accordance with the present invention, there is provided an apparatus for transmitting a forward ACK/NACK through multiple layers in an OFDM mobile communication system, including a controller for determining whether transmission of an ACK/NACK is transmission for a first reverse layer or transmission for layers higher than the first reverse layer, and when the transmission of an ACK/NACK is transmission for layers higher than the first reverse layer, setting a number of times for repeating an ACK/NACK for the higher layers differently from a number of times by which the ACK/NACK for the first layer is repeated, and a repeater for repeating the ACK/NACK for the higher layers by the set number of times.

In accordance with the present invention, there is provided a method for transmitting a reverse ACK/NACK through multiple layers in an OFDM mobile communication system, including determining whether transmission of the ACK/NACK is transmission for a first forward layer or transmission for layers higher than the first forward layer, and when the transmission of the ACK/NACK is transmission for layers higher than the first forward layer, transmitting the reverse ACK/NACK according to a CDMA scheme.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted for the sake of clarity and conciseness. Further, various specific definitions found in the following description are provided only to help general understanding of the present invention, and it is apparent to those skilled in the art that the present invention can be implemented without such definitions.

According to an embodiment of the present invention, in a system transmitting data for multiple layers and supporting HARQ for each layer in a forward direction, when transmission of an ACK/NACK is transmission for a first layer, transmitting a reverse ACK/NACK by using partial DFT input indexes of N-point DFT or a partial code of an available orthogonal code, or when the transmission of the ACK/NACK is transmission for layers higher than the first layer, transmitting the reverse ACK/NACK by using all DFT input indexes of N-point DFT or all available orthogonal codes.

According to another embodiment of the present invention, in a system transmitting data for multiple layers and supporting HARQ for each layer in a reverse direction, when the transmission of an ACK/NACK is for layers higher than a first layer, transmitting an ACK/NACK for the higher layers after repeating the ACK/NACK a number of times different from a number of times by which the ACK/NACK for the first layer has been repeated.

Further, the present invention discloses a method for measuring a quantity of interference in a receiver for improvement of the reception capability by the above ACK/NACK transmission method.

Figure 1:
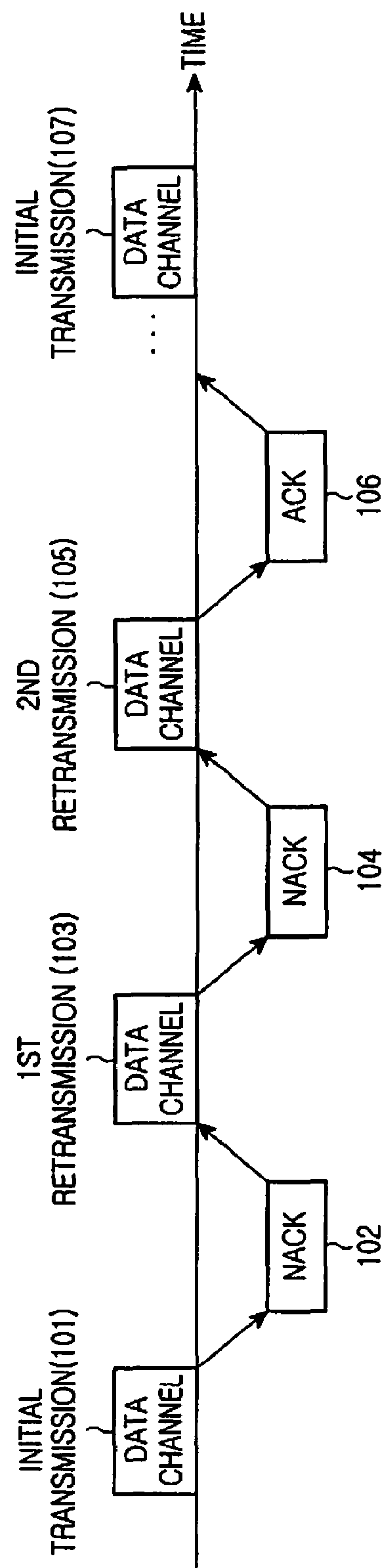
FIG. 1 illustrates an example of a conventional HARQ.
Figure 2:
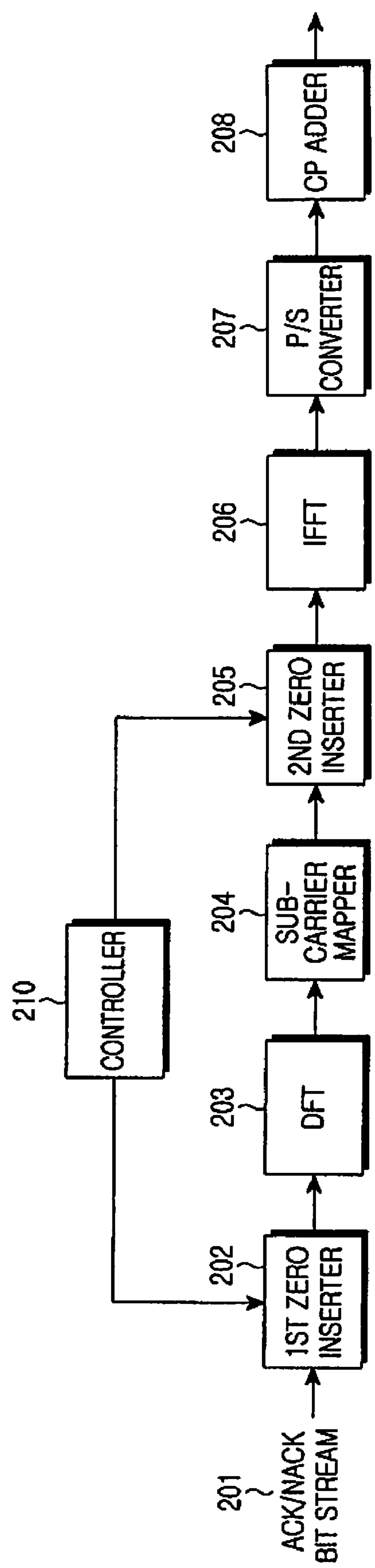
FIG. 2 illustrates a conventional structure of a conventional transmitter for transmitting a reverse ACK/NACK response in response to forward data transmission received by an MS.
Figure 3:
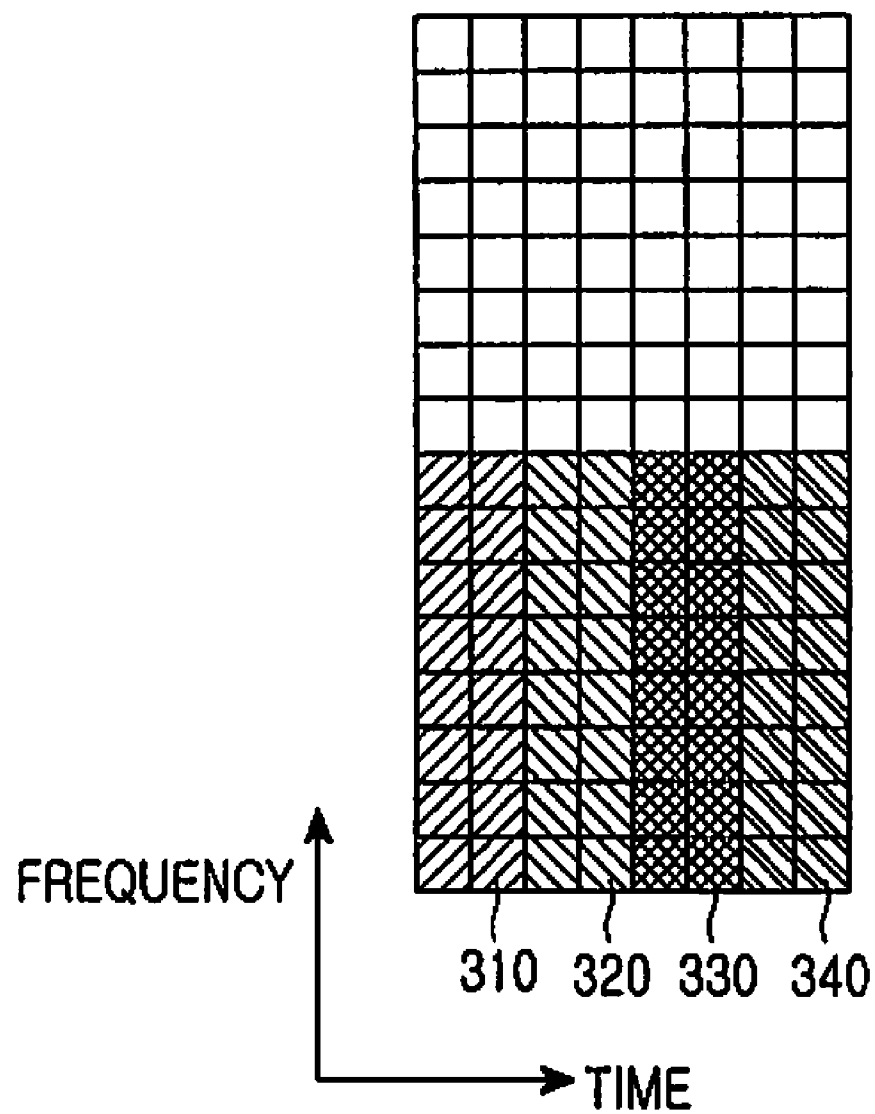
FIG. 3 illustrates a conventional mapping relation between reverse ACK/NACK transmission and forward resource channels, and a sub-carrier mapping process by the sub-carrier mapper of FIG. 2.
Figure 4:
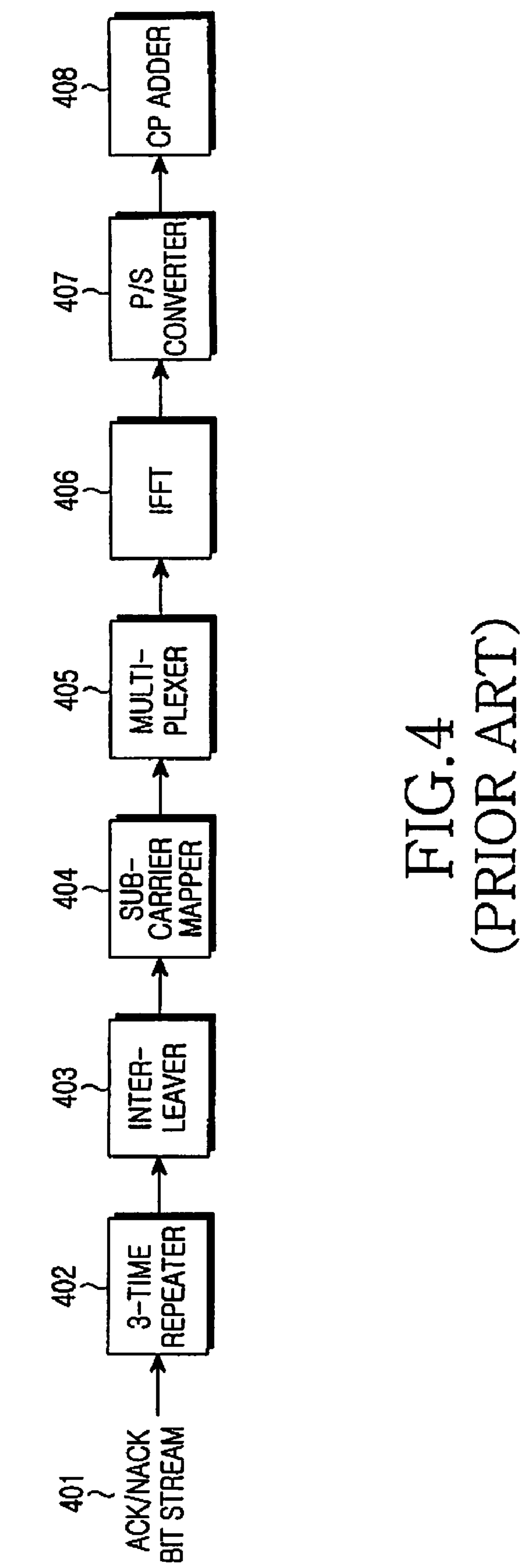
FIG. 4 illustrates a structure of a transmitter transmitting a forward ACK/NACK response to reverse data transmission from a plurality of MSs according to the prior art.
Figure 5A:
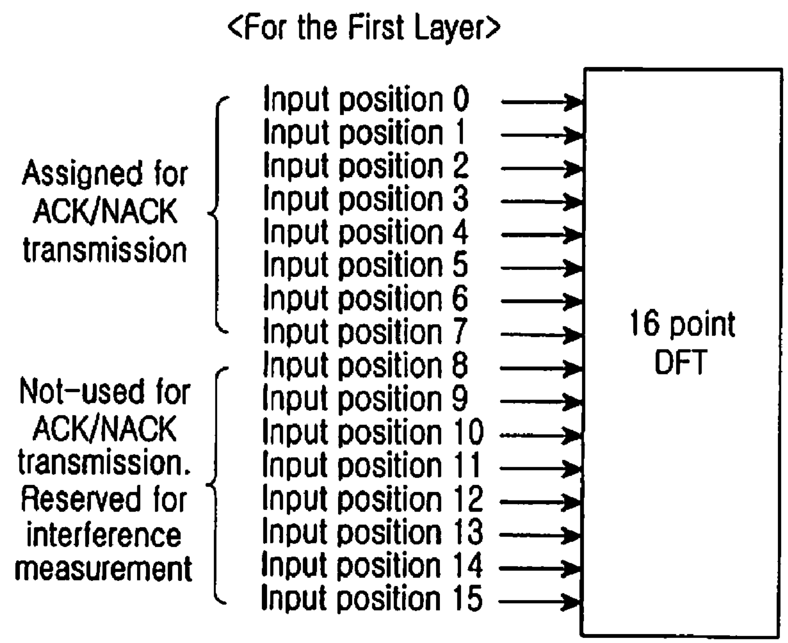
FIGS. 5A and 5B illustrate resource allocation schemes for reverse ACK/NACK transmission for each layer according to the present invention.
Figure 5B:
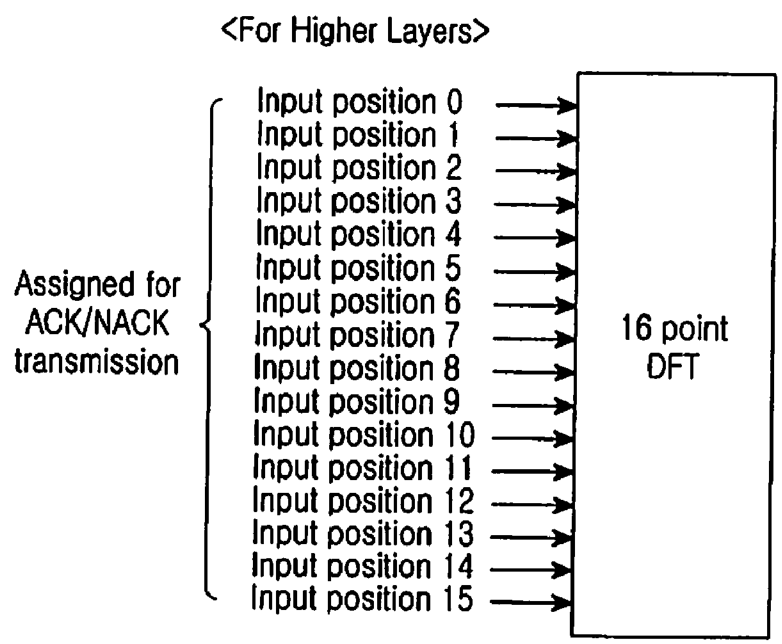

FIGS. 5A and 5B illustrate resource allocation schemes for reverse ACK/NACK transmission for each layer according to the present invention.

FIG. 5A illustrates a resource allocation scheme for reverse ACK/NACK transmission for the first layer, and FIG. 5B illustrates a resource allocation scheme for reverse ACK/NACK transmission for the higher layers.

For the first layer, the same method as the conventional method is used. That is, from among the 16 point inputs, only 8 inputs are mapped in the first layer, while all of the 16 point DFT inputs are used for the ACK/NACK transmission in the other layers. The reason why more DFT inputs can be used for the ACK/NACK transmission in the higher layers than the first layer is that usually there are not many resources using multiple layers, even in a system supporting multiple layers for forward data transmission. This is because it is necessary to satisfy various conditions in order to get an actual gain by transmitting data through the multiple layers. For example, when two MSs in very good channel conditions are simultaneously allocated to one resource channel, it is possible to get a higher throughput than when only one MS is allocated to the resource channel. However, when two MSs in bad channel conditions are simultaneously allocated to one resource channel, the throughput may be rather degraded in comparison with when one MS is allocated to the resource channel. When two layers are used according to a method disclosed in the present invention, a total of three tiles, including two tiles for the first layer and one tile for the second layer, are used for the ACK/NACK transmission. This yields an effect of resource saving as much as one tile in comparison with the prior art using four tiles. When four layers are used according to a method disclosed in the present invention, a total of five tiles including two tiles for the first layer and one tile for each of the second layer to the fourth layer, are used for the ACK/NACK transmission. This yields an effect of resource saving as much as three tiles in comparison with the prior art using eight tiles.

Meanwhile, although the same number of DFT inputs are mapped to the ACK/NACK transmission for the higher layers in FIGS. 5A and 5B, it is possible to employ a modified mapping method, in which eight inputs are mapped to the first layer, 12 inputs are mapped to the second layer, 16 inputs are mapped to the third layer and 20 inputs are mapped to the fourth layer. That is, it is possible to employ various modifications based on the principle that more DFT inputs than those mapped to the first layer are mapped to all the higher layers for the ACK/NACK transmission.

According to a method disclosed in the present invention, four sub-tiles are used in the ACK/NACK transmission for the first layer, while two sub-tiles are used in the ACK/NACK transmission for the second layer. This can be extended into a modification in which the same allocation as that of the prior art is applied to the first layer and two tiles are allocated to the second layer. Then, the ACK/NACK transmission is performed over two tiles, which may degrade the diversity effect, thereby causing performance deterioration. This problem will be discussed in more detail with reference to FIG. 6.

Figure 6:
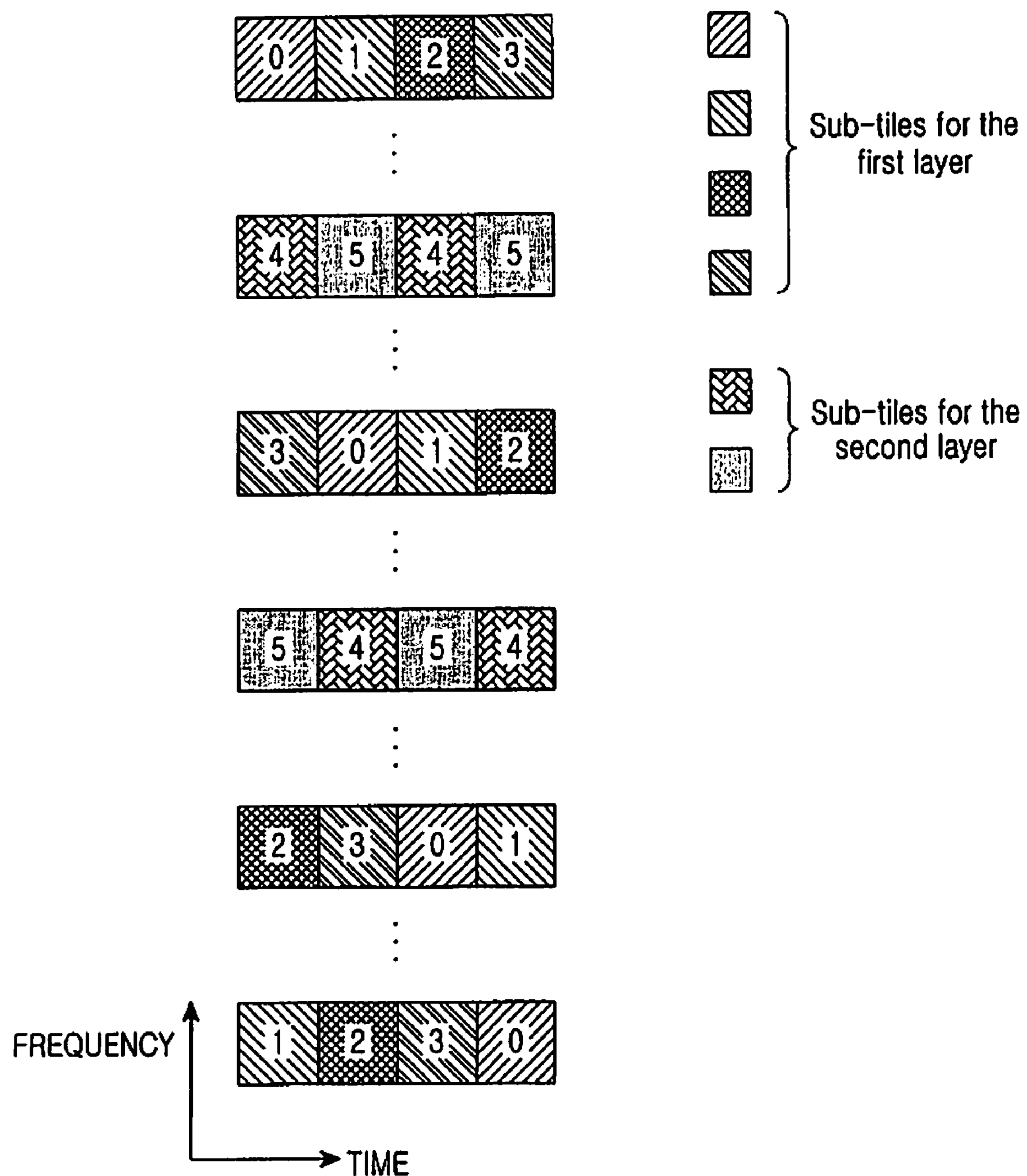
FIG. 6 illustrates a method of allocating resources for reverse ACK/NACK transmission in a mobile communication system according to the present invention.

In FIG. 6, each cell corresponds to one sub-tile. That is, each cell includes two adjacent OFDM symbols on a time axis and eight adjacent sub-carriers on a frequency axis. In FIG. 6, sub-tiles for the first layer are the same as those of the prior art. The number recorded in each cell corresponds to a sub-tile index of a sub-tile for carrying a plurality of particular ACK/NACKs, which is used for transmission of a predetermined number of ACK/NACK bits. That is, sub-tile index 0 indicates a sub-tile used for ACK/NACK transmission for forward resource channels 0 to 7 of the first layer, sub-tile index 1 indicates a sub-tile used for ACK/NACK transmission for forward resource channels 8 to 15 of the first layer, sub-tile index 2 indicates a sub-tile used for ACK/NACK transmission for forward resource channels 16 to 23 of the first layer, sub-tile index 3 indicates a sub-tile used for ACK/NACK transmission for forward resource channels 24 to 31 of the first layer, sub-tile index 4 indicates a sub-tile used for ACK/NACK transmission for forward resource channels 0 to 15 of the second layer, and sub-tile index 5 indicates a sub-tile used for ACK/NACK transmission for forward resource channels 16 to 31 of the second layer.

FIG. 6 illustrates a method of allocating resources for reverse ACK/NACK transmission in a mobile communication system according to the present invention.

Referring to FIG. 6, sub-tiles 0 to 3 for ACK/NACK transmission for the first layer are arranged in the same manner as in the prior art, and sub-tiles 4 and 5 for ACK/NACK transmission for the second layer are arranged in a repeating manner by additionally using two sub-tiles.

In FIG. 6, the ACK/NACK for the first layer is distributed over four sub-tiles on the frequency axis, so that it is possible to achieve a sufficient diversity effect. However, since the ACK/NACK for the second layer is distributed over only two sub-tiles, it has a degraded frequency diversity effect.

Therefore, in resource allocation for reverse ACK/NACK transmission for multiple layers, the present invention discloses a method for mapping an ACK/NACK resource to each layer as follows. The following method is based on an unchangeable assumption that four sub-tiles are used on the time axis.

1) A sequence including four repeated sequential sub-tile indexes is constructed.

When two layers are used, six sub-tiles are used according to the present invention. Therefore, the sequence becomes 0, 1, 2, 3, 4, 5, 0, 1, 2, 3, 4, 5, 0, 1, 2, 3, 4, 5, 0, 1, 2, 3, 4, 5.

2) The sub-tile indexes are divided four indexes by four indexes, so as to construct six streams.

In the example using the two layers, the sequence includes six streams as follows.

0, 1, 2, 3,
4, 5, 0, 1,
2, 3, 4, 5,
0, 1, 2, 3,
4, 5, 0, 1,
2, 3, 4, 5

3) The six streams are transmitted to six sub-tiles, respectively.

As a result, the same sub-tile index is prevented from being located in the same stream, and sub-tiles with the same index are sufficiently spaced from each other in the frequency domain, thereby achieving the diversity effect.

4) In order to prevent the same sub-tile from being located on the same position of the time axis, random permutation or offset may be applied to each stream.

Figure 7:
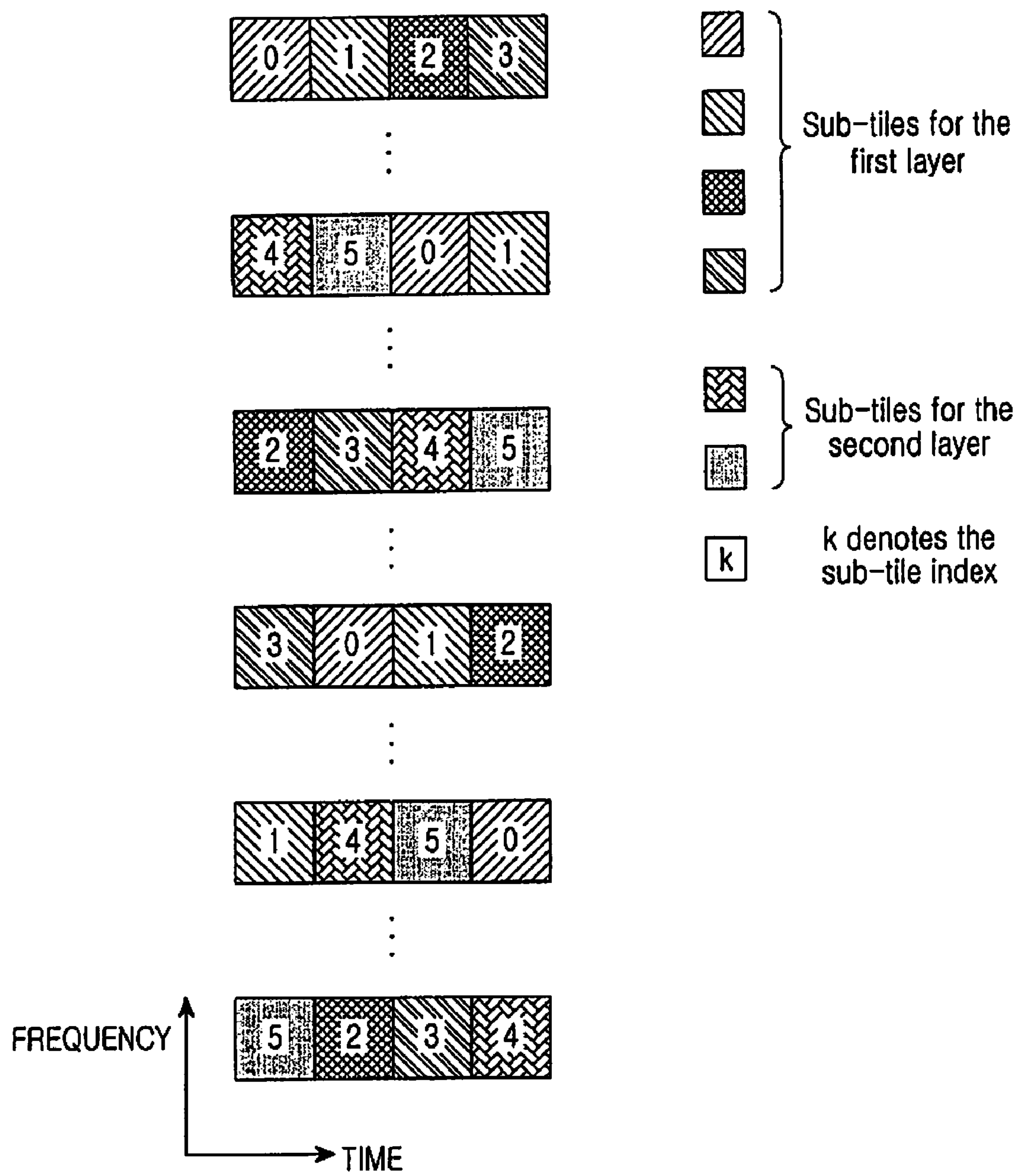
FIG. 7 illustrates an arrangement of different sub-tiles for ACK/NACK transmission for two layers according to the rule described in the description of FIG. 6.

FIG. 7 illustrates an arrangement of different sub-tiles for ACK/NACK transmission for two layers according to the rule described in the description of FIG. 6.

Referring to FIG. 7, it is noted that the ACK/NACK transmission for all the layers can achieve the maximum diversity in the time and frequency domain.

According to the above-described ACK/NACK resource allocation method, different quantities of resources are allocated to multiple layers, while the same ACK/NACK transmission scheme is used for the multiple layers. Hereinafter, another embodiment of the present invention employing different ACK/NACK transmission schemes for multiple layers will be described. Specifically, this embodiment of the present invention employs the same method as that of the prior art for the first layer while employing a CDMA transmission scheme for the higher layers. That is, according to this embodiment of the present invention, each MS spreads an ACK/NACK to be transmitted by using a specific code of the MS, and then transmits the spread ACK/NACK to the higher layer through a time and frequency domain for CDMA transmission.

Figure 8:
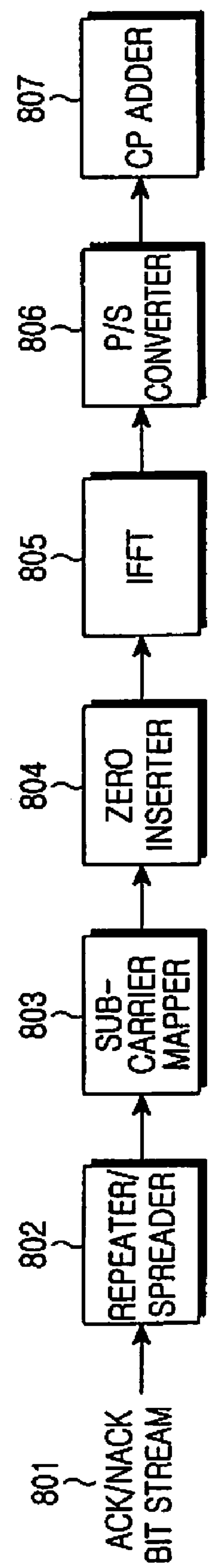
FIG. 8 illustrates a structure of a transmitter for ACK/NACK transmission for a higher layer according to the present invention.

FIG. 8 illustrates a structure of a transmitter for ACK/NACK transmission for a higher layer according to the present invention.

In FIG. 8, reference numeral 801 denotes an ACK/NACK, which is selectively determined according to whether received forward data has been correctly demodulated, and if not, requires retransmission thereof. The ACK/NACK 801 is input to a repeater/spreader 802, which performs repetition and spreading by using a spreading code specific to each MS. Different spreading codes are used according to layers. That is, when the spreading code is generated, layer index information is used. Further, the spreading code is also generated by using a forward resource channel index, so that spreading can be performed using different spreading codes according to resource channels. The outputs of the repeater/spreader 802 are input to the sub-carrier mapper 803, in which the outputs of the repeater/spreader 802 are mapped to sub-carriers at positions from among the 480 sub-carriers as in the above-described example. If the OFDM system employs 512 size FFT, the zero inserter 804 fills "0" in sub-carriers at the other positions other than those of the outputs of the sub-carrier mapper 803. Then, the sub-carriers are processed by the IFFT unit 805, a P/S converter 806 and a CP adder 807 according to a conventional OFDM symbol generating process for transmission.

Figure 9:
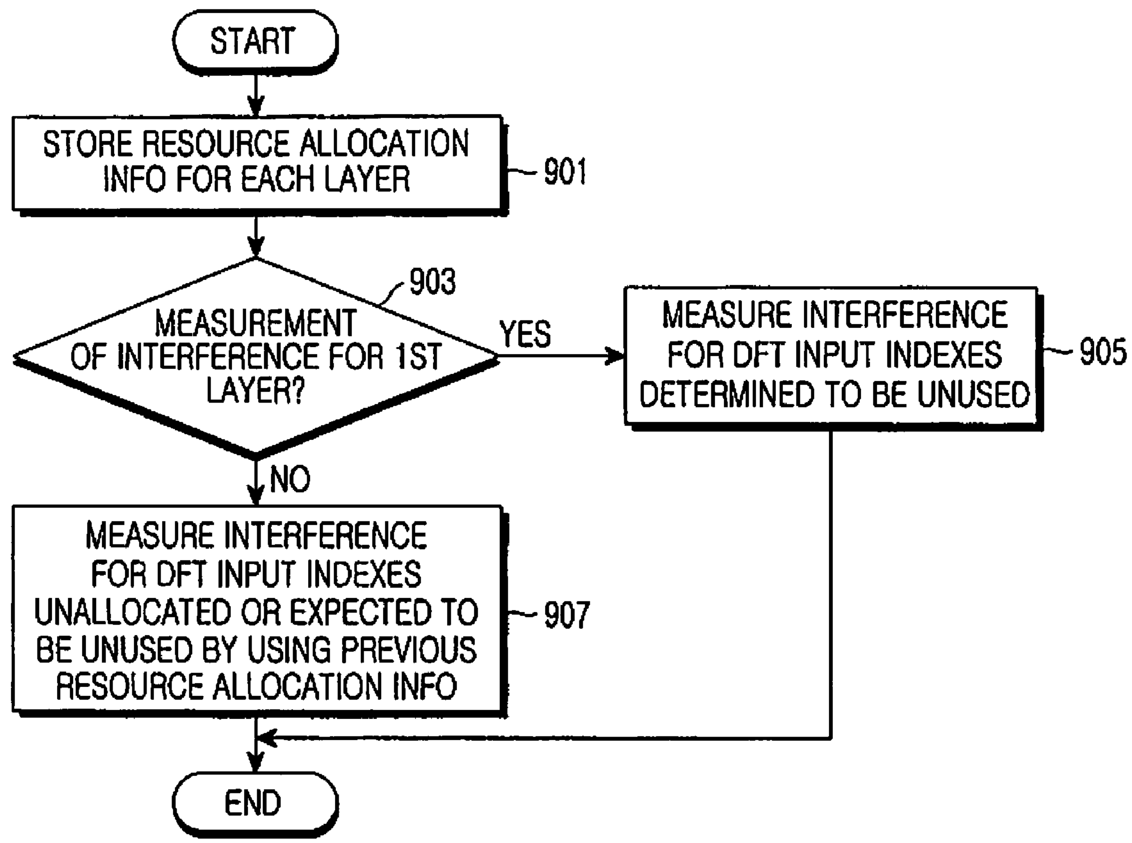
FIG. 9 illustrates a method of measuring a quantity of interference for each sub-tile by a base station receiver transmitting a reverse ACK/NACK with different quantities of allocated resources for the respective layers according to the same transmission scheme regardless of the layers.

FIG. 9 illustrates a method of measuring a quantity of interference for each sub-tile by a base station receiver transmitting a reverse ACK/NACK with different quantities of allocated resources for the respective layers according to the same transmission scheme regardless of the layers.

Referring to FIG. 9, in step 901, a Base Station (BS) allocates resources for resource channels and multiple layers, and stores resource allocation information at each time interval. After transmitting actual forward data corresponding to the allocated resources, the BS determines whether the ACK/

NACK relates to the first layer during demodulation of a reverse ACK/NACK response to the data transmission (step 903).

When the demodulated ACK/NACK relates to the first layer, the base station measures in step 905 the quantity of interference to DFT input indexes having been promised in advance to be unused, and then uses the measured values as weights in combining ACK/NACK bits received through multiple sub-tiles. That is, in the above example, DFT inputs 8 to 15 are not used for the first layer. Therefore, those inputs can be used in measuring the quantity of interference to each sub-tile.

However, when the demodulated ACK/NACK does not relate to the first layer but relates to a higher layer, the BS proceeds to step 907, in which the BS measures the quantity of interference to DFT input indexes corresponding to resource channels not having been allocated to the higher layer by referring to the resource allocation information stored in step 901, and then uses the measured values as weights in combining ACK/NACK bits received through multiple sub-tiles.

Figure 10:
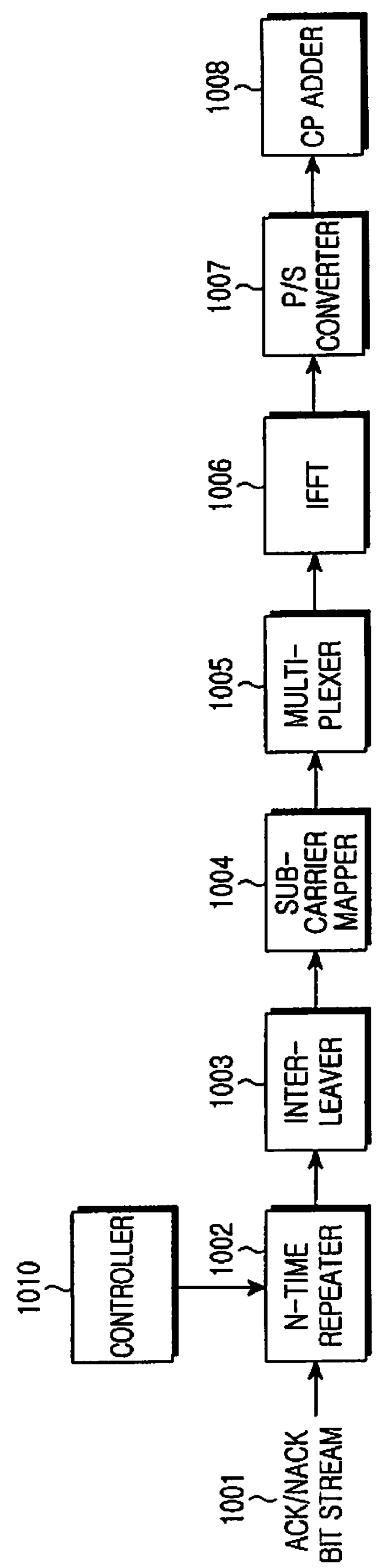
FIG. 10 illustrates a transmitter for transmitting forward ACK/NACK according to the present invention.

FIG. 10 illustrates a transmitter for transmitting forward ACK/NACK according to the present invention.

The transmitter includes an N-time repeater 1002, an interleaver 1003, a sub-carrier mapper 1004, a multiplexer 1005, an IFFT unit 1006, a P/S converter 1007 and a CP adder 1008.

In FIG. 10, reference numeral 1001 denotes an ACK/NACK bit stream, which includes ACK/NACK bits for resource channels of multiple reverse layers. The ACK/NACK bit stream has a value selectively determined according to whether the received reverse data has been correctly demodulated, and if not, requires retransmission thereof.

The N-time repeater 1002 repeats the ACK/NACK bit stream N times. During the repetition, the controller 1010 controls the number of times of repetition. An embodiment of the present invention discloses a number of times of repetition, which changes according to the layer. For example, three times of repetition is performed for the first layer and two times of repetition is performed for the higher layers. Usually, reduction of the number of times of repetition degrades the diversity gain, thereby degrading the reception capability. In other words, in order to achieve the same reception capability, it is necessary to use a higher transmission power. The reason why the number of times of repetition is reduced for the higher layers in spite of such a necessity is that reverse data transmission to the multiple layers does not frequently occur. Therefore, the transmission power is saved by sufficiently guaranteeing the number of times of repetition for the first layer, which is a basic layer. In contrast, for the transmission to the higher layers, which does not frequently occur, forward resources are saved, even though a rather large amount of transmission power is used. This method is more effective in a system having limited resources, such as a cellular system.

The interleaver 1003 interleaves the bit streams repeated different numbers of times for each layer according to an interleaving scheme, and then outputs the interleaved bit streams. Then, the sub-carrier mapper 1004 maps the outputs of the interleaver 1003 to sub-carriers. Usually, in the mapping, the bits are distributed as widely as possible in the time and frequency domain, in order to achieve the diversity effect as much as possible. The multiplexer 1005 multiplexes the outputs of the sub-carrier mapper 1004. Specifically, the multiplexer 1005 multiplexes the outputs of the sub-carrier mapper 1004 with another channel, for example, a forward data channel. The output of the multiplexer 1005 is transmitted after being processed by the IFFT unit 1006, the P/S converter 1007 and the CP adder 1008 according to a conventional OFDM symbol generating process.

Figure 11:
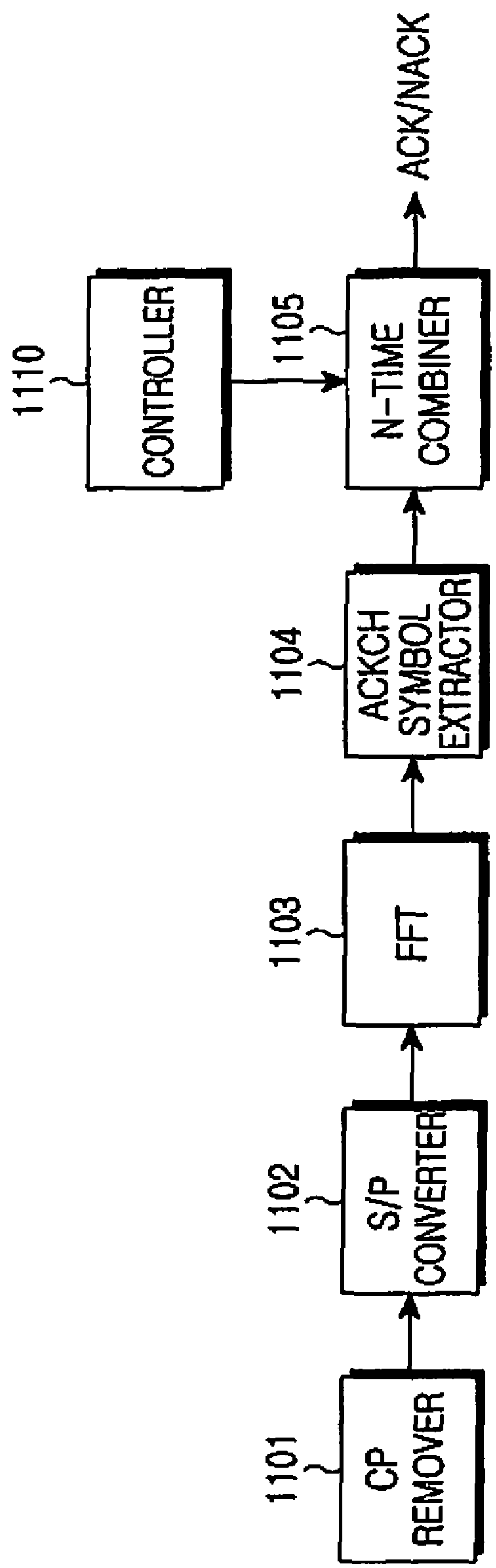
FIG. 11 illustrates a structure of a receiver according to the present invention.

FIG. 11 illustrates a structure of a receiver according to the present invention.

The receiver includes a CP remover 1101, a S/P converter 1102, an FFT unit 1103, an ACKCH symbol extractor 1104, an N-time combiner 1105 and a controller 1110.

Referring to FIG. 11, the CP remover 1101, the S/P converter 1102 and the FFT unit 1103 are conventional blocks performing CP removal, S/P conversion and FFT, respectively, in a conventional OFDM receiver. An output of the FFT unit 1103 is input to the ACKCH symbol extractor 1104. The ACKCH symbol extractor 1104 extracts the symbols carrying the ACKCH according to a process. The ACKCH symbol extractor 1104 performs a reverse process of the sub-carrier mapper 1004. The extracted symbols are input to the N-time combiner 1105, which is controlled by the controller 1110. Under the control of the controller 1110, the combiner 1105 performs combining as many times as the number of times of repetition corresponding to each layer. The output of the N-time combiner 1105 is the final ACK/NACK bit stream.

Figure 12:
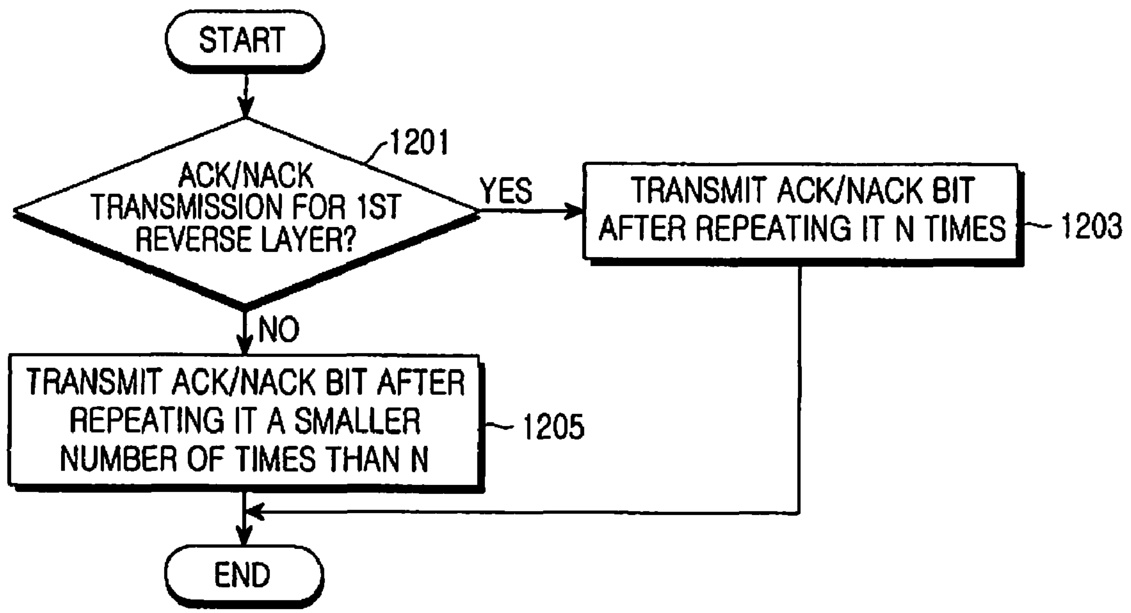
FIG. 12 illustrates a first method for forward ACK/NACK transmission in a mobile communication system according to an embodiment of the present invention.

FIG. 12 illustrates a first method for forward ACK/NACK transmission in a mobile communication system according to the present invention.

In step 1201, a BS determines whether the ACK/NACK transmission is for the first layer. When the ACK/NACK transmission is for the first layer, the BS repeatedly transmits the ACK/NACK bit stream three times as in the prior art (step 1203). In other words, the BS repeatedly transmits the ACK/NACK bit stream a number N of times. However, when the ACK/NACK transmission is not for the first layer, that is, but is for a higher layer, the BS repeatedly transmits the ACK/NACK bit stream a smaller number of times than N times (step 1205).

Figure 13:
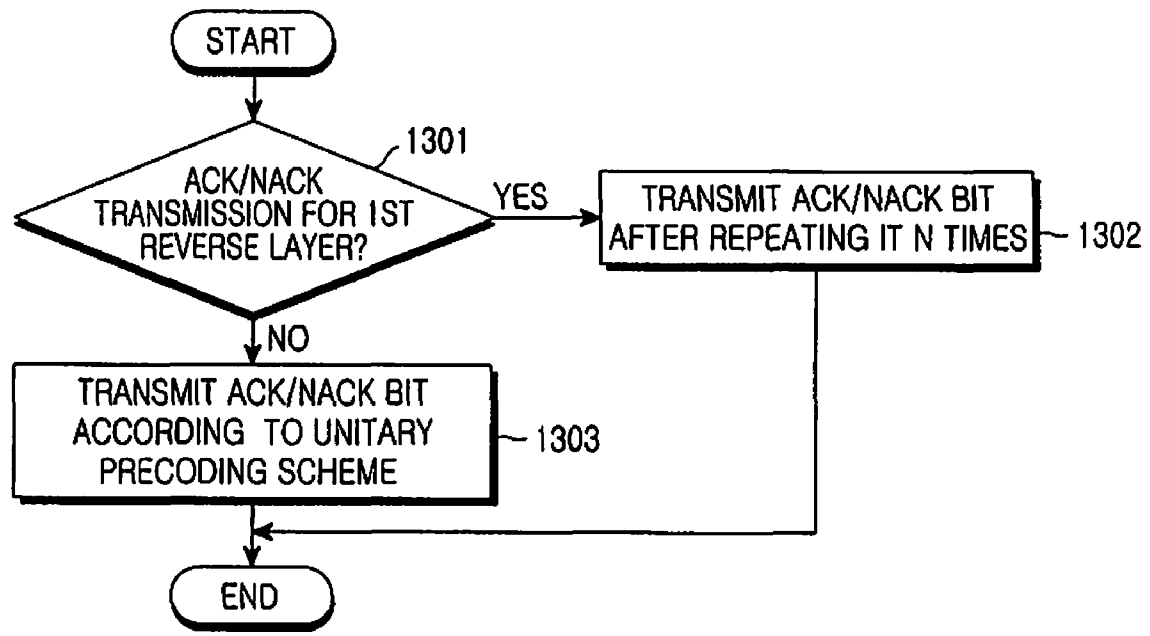
FIG. 13 is a flow diagram illustrating a second method for forward ACK/NACK transmission in a mobile communication system according to an embodiment of the present invention.

FIG. 13 illustrates a second method for forward ACK/NACK transmission in a mobile communication system according to the present invention.

The second method corresponds to a method using different ACK/NACK transmission schemes for multiple layers.

In step 1301, a BS determines whether the ACK/NACK transmission is for the first layer. When the ACK/NACK transmission is for the first layer, the BS repeatedly transmits the ACK/NACK bit stream three times as in the prior art (step 1303). In other words, the BS repeatedly transmits the ACK/NACK bit stream a number N of times. However, when the ACK/NACK transmission is not for the first layer, but is for a higher layer, the BS transmits the ACK/NACK bit stream according to a unitary preceding scheme. A structure and an operation of an ACK/NACK transceiver using the unitary precoding scheme are known in the art, so description thereof is omitted here.

As described above, for the first layer, which is the basic layer, the to transmission power is saved by repeating the transmission three times. In contrast, in the case of transmission for the higher layer, which does not frequently occur, a unitary coding scheme capable of saving forward resources in spite of using a rather large amount of transmission power is used, so as to achieve efficient use of forward resources.

According to the present invention, it is possible to save resources allocated for forward ACK/NACK transmission and thus improve forward data throughput in an OFDM based packet data mobile communication system supporting HARQ for multiple reverse layer data transmissions.

Now, effects of the present invention, which has the construction and operation as described above, will be briefly described.

According to the present invention, it is possible to save resources allocated for reverse ACK/NACK transmission and thus improve reverse data throughput in an OFDM based packet data mobile communication system supporting HARQ for multiple forward layer data transmissions.

Further, according to the present invention, in a system transmitting reverse data for multiple layers and supporting HARQ for each layer, a forward ACK/NACK is transmitted with different quantities of allocated resources for the respective layers according to the same transmission scheme regardless of the layers. According to another embodiment of the present invention, in a system transmitting reverse data for multiple layers and supporting HARQ for each layer, a forward ACK/NACK is transmitted according to different transmission schemes for the respective layers.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transmitting an ACKnowledgement/Non-ACKnowledgement (ACK/NACK) in a transmitter of an Orthogonal Frequency Division Multiplexing (OFDM) mobile communication system supporting data transmission through multiple layers, the method comprising the steps of:

determining, by the transmitter, whether transmission of an ACK/NACK is transmission for a first layer or transmission for layers higher than the first layer;

when the transmission of the ACK/NACK is transmission for the first layer, transmitting, by the transmitter, the ACK/NACK by using partial Discrete Fourier Transform (DFT) input indexes of N-point DFT or a partial code of an available orthogonal code; and when the transmission of the ACK/NACK is transmission for layers higher than the first layer, transmitting, by the transmitter, the ACK/NACK by using all DFT input indexes of N-point DFT or all available orthogonal codes, wherein the ACK/NACK is transmitted by mapping allocated resources for transmission of the ACK/NACK.

2. The method of claim 1, further comprising, constructing a basic resource unit for data transmission, and one-to-one mapping resources for ACK/NACK transmission to the basic resource unit, respectively.

3. The method of claim 2, further comprising:

allocating resources to multiple layers, and storing resource allocation information;

determining whether ACK/NACK demodulation is for the first layer or for the layers higher than the first layer; and when the ACK/NACK demodulation is for the first layer, measuring a quantity of interference for Discrete Fourier Transform (DFT) input indexes or orthogonal codes determined in advance to be unused.

4. The method of claim 3, further comprising, when the ACK/NACK demodulation is demodulation for the layers higher than the first layer, measuring a quantity of interference for DFT input indexes or orthogonal codes corresponding to resource channels that have not been allocated to the higher layers by using the stored resource allocation information.

5. A method for transmitting an ACKnowledgement/Non-ACKnowledgement (ACK/NACK) in a transmitter of an Orthogonal Frequency Division Multiplexing (OFDM) mobile communication system supporting data transmission through multiple layers, the method comprising the steps of:

determining, by the transmitter, whether transmission of an ACK/NACK is for a first layer or for layers higher than the first layer; and when transmission of the ACK/NACK is for layers higher than the first layer, transmitting, by the transmitter, the ACK/NACK for the higher layers after repeating the ACK/NACK a number of times different from a number of times by which the ACK/NACK for the first layer has been repeated.

6. The method of claim 5, wherein the ACK/NACK for the higher layers is transmitted after being repeated a smaller number of times than the number of times by which the ACK/NACK for the first layer has been repeated.

7. The method of claim 5, further comprising, when the transmission of the ACK/NACK is transmission for the higher layers, transmitting the ACK/NACK according to a unitary precoding scheme.

8. An apparatus for transmitting an ACKnowledgement/NonACKnowledgement (ACK/NACK) in an Orthogonal Frequency Division Multiplexing (OFDM) mobile communication system supporting data transmission through multiple layers, the apparatus comprising:

a controller for determining whether transmission of an ACK/NACK is for a first layer or for layers higher than the first layer, and when transmission of the ACK/NACK is transmission for the first layer, transmitting the ACK/NACK by using partial Discrete Fourier Transform (DFT) input indexes of N-point DFT or a partial code of an available orthogonal code, or when the transmission of the ACK/NACK is transmission for layers higher than the first layer, transmitting the ACK/NACK by using all DFT input indexes of N-point DFT or all available orthogonal codes; and a sub-carrier mapper for mapping allocated resources for transmission of the ACK/NACK.

9. The apparatus of claim 8, wherein the controller constructs a basic resource unit for data transmission, and one-to-one maps resources for ACK/NACK transmission to the basic resource unit, respectively.

10. An apparatus for transmitting an ACKnowledgement/NonACKnowledgement (ACK/NACK) in an Orthogonal Frequency Division Multiplexing (OFDM) mobile communication system supporting data transmission through multiple layers, the apparatus comprising:

a controller for determining whether transmission of an ACK/NACK is for a first layer or for layers higher than the first layer, and when transmission of the ACK/NACK is for layers higher than the first layer, setting a number of times for repeating the ACK/NACK for the higher layers differently from a number of times by which the ACK/NACK for the first layer is repeated; and a repeater for repeating the ACK/NACK for the higher layers by the set number of times.

11. The apparatus of claim 10, wherein the controller transmits the ACK/NACK for the higher layers after repeating the ACK/NACK a smaller number of times than the number of times by which the ACK/NACK for the first layer has been repeated.

12. The apparatus of claim 10, wherein when the transmission of the ACK/NACK is for the higher layers, the controller transmits the ACK/NACK according to a unitary precoding scheme.

* * * * *